United States Patent [19]

Ward

[11] Patent Number: 4,535,475
[45] Date of Patent: Aug. 13, 1985

[54] AUDIO REPRODUCTION APPARATUS

[76] Inventor: Cornelius S. Ward, 2038 85th Ave., Oakland, Calif. 94621

[21] Appl. No.: 427,000

[22] Filed: Sep. 23, 1982

[51] Int. Cl.³ .............................................. G11B 5/02
[52] U.S. Cl. .................................. 381/88; 179/146 R; 369/12
[58] Field of Search ............... 179/146 R, 179, 178, 179/184; 381/87, 88, 90; 455/351, 347, 90, 89, 128; 312/7.1; 369/12, 1, 6, 2

[56] References Cited

U.S. PATENT DOCUMENTS

| 3,070,748 | 12/1962 | Worobey | 455/351 |
| 3,077,563 | 2/1963 | Combs | 455/351 |
| 3,763,434 | 10/1973 | Blesch | 455/351 |
| 3,824,472 | 7/1974 | Engel | 369/12 |
| 3,943,564 | 3/1976 | Tushinsky | 369/12 |
| 4,225,965 | 9/1980 | Baugh | 455/351 |
| 4,257,121 | 3/1981 | Henderson | 455/351 |

Primary Examiner—Gene Z. Rubinson
Assistant Examiner—L. Schroeder
Attorney, Agent, or Firm—Bielen and Peterson

[57] ABSTRACT

An audio reproduction apparatus utilizing a speaker, electrical battery, amplifier, and source of electrical signals having a case for supporting the same. The electrical battery and source of electrical signals are held in relation to one another within the case.

6 Claims, 2 Drawing Figures

U.S. Patent  Aug. 13, 1985  4,535,475
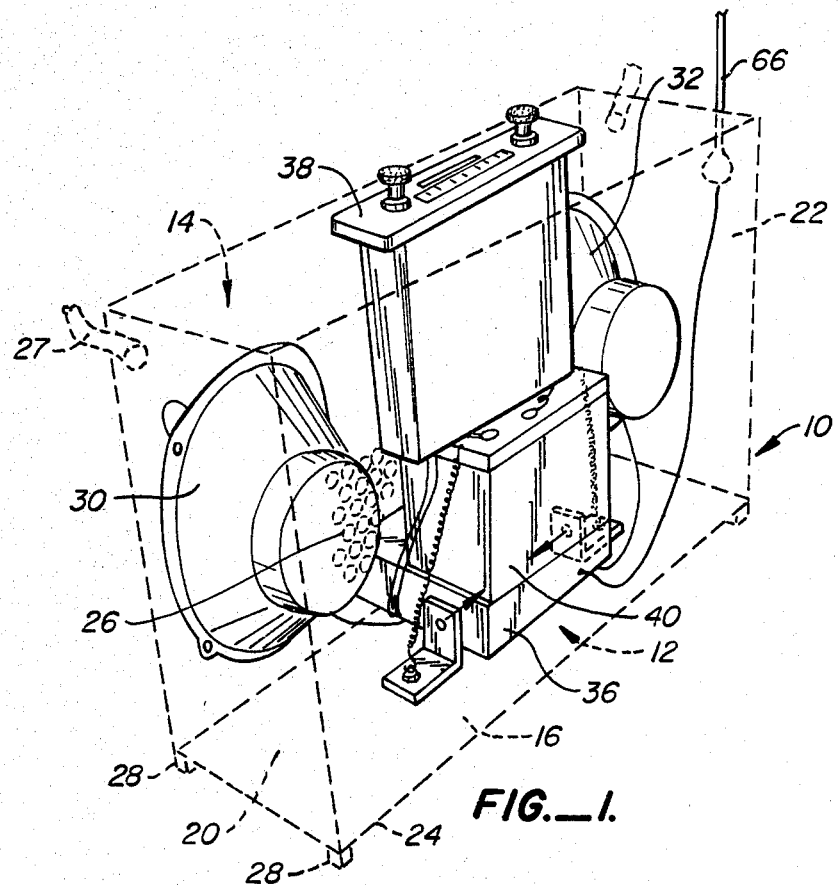
FIG._1.
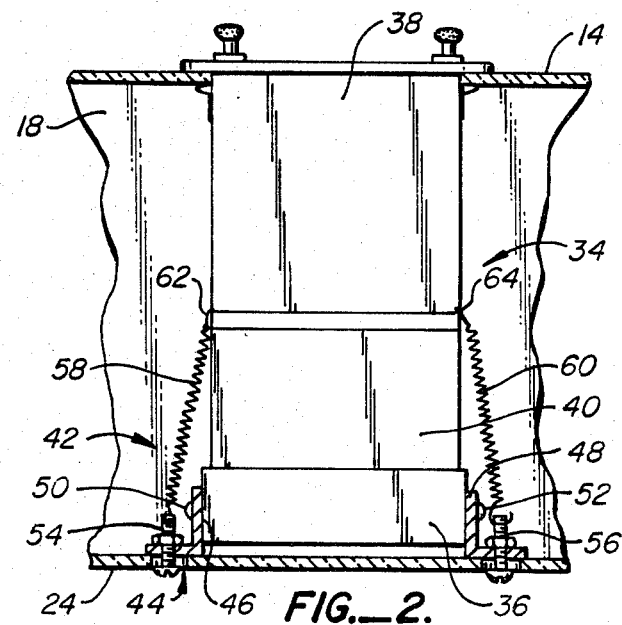
FIG._2.

4,535,475

AUDIO REPRODUCTION APPARATUS

BACKGROUND OF THE INVENTION

The present invention relates to a normal audio reproduction apparatus which may be portable that contains the necessary elements of the apparatus against damage during transportation of the apparatus.

Portable radios have been in use for a number of years. Recently, portable radios have increased in size such that they are usable as an audio system within a dwelling or during travel. Is important in large portable radios that the components be mounted properly to prevent damage to the same. Also, access to the different portions of the radio or taperecorder is important. Every case for a portable audio reproduction apparatus is necessarily flexible. Is therefore a problem in holding the components in place during flexure of the case while it is being moved.

An audio reproduction apparatus which securely mounts the components and allows for flexibility of the case would be a great advance in the field of portable audio equipment.

SUMMARY OF THE INVENTION

In accordance with the present invention a novel and useful audio reproduction apparatus is provided.

The audio reproduction apparatus of the present invention utilizes at least one speaker, an electrical battery, and component means for supplying electrical signals to the at least one speaker for the production of sound.

A case, which may be transparent is employed to support the at least one speaker, electrical battery, and component means.

Means is also provided for holding the electrical battery in relation to the component means for supplying electrical signals. Such holding means may take the form of bracket means which contacts the component means and is also connected to the case. A member connects to the bracket means and extends to the electrical battery.

In certain instances the member connected to the bracket may include a spring which urges the electrical battery and component means into compression. Where the component means includes a first and second component. two springs maybe used in combination combined to hold electrical battery to the first component. The second component would contact the electrical battery, preferably on another surface of the electrical battery. Thus, the electrical battery is held by two components and is affectively immobilzed thereby.

It may be apparent that a novel and useful audio reproduction apparatus has been described.

It is therefore an object of the present invention to provide an audio reproduction apparatus which is easily portable and includes components which are securely held to the source of power within the case.

It is another object of the present invention to provide an audio reproduction apparatus which is secured within a flexible case and is not damaged by any movement imparted to the case.

It is another object of the present invention to provide an audio reproduction apparatus which protects the audio components and source of power and possesses a weight distribution balance.

The invention possesses other objects and advantages especially as concerns particular characteristics and features thereof which will become apparent as this specification continues.

BRIEF DESCRIPTION OF THE DRAWINGS

FIG. 1 is a rear perspective view of the apparatus of the present invention.

FIG. 2 is a rear broken sectional view showing the electrical battery and components of the present invention.

For a better understanding of the invention reference is made to the following detailed description of the preferred embodiments thereof which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the hereinabove described drawings.

The invention as a whole is represented in the drawings by reference character 10. The apparatus 10 includes a case 12 which maybe constructed of transparent material such as plexiglass and the like. The case 12 includes a top portion 14, rear portion 16, front portion 18, side portions 20 and 22 and a bottom portion 24. The portion of case 12 maybe glued or otherwise fasten together to form case 12. A plurality of openings 26 which maybe placed in rear portion 16 as well as front portion 18, permit the apparatus 10 to breathe during the production of sound waves. A multiplicity of feet 28 helps support case 12 above a ground surface, while strap 27 aids in the carrying of case 12.

The apparatus 10 includes a pair of speakers 30 and 32 which mount to front portion 18. Component means 34 is also provided for supplying electrical signals for speakers 30 and 32 for sound production. Component means 34 may include a radio amplifier 36 and a tape deck 38. It should be noted that component means 34 is not restricted to these particular components. Also included is an electrical battery 40 which serves as a source of electrical power for apparatus 10. Electrical battery maybe a 12 volt dry cell battery such as the one manufactured by RAY-O-VAC, No. 926. As with known portable radios, apparatus 10 may include means for utilizing AC as well as DC power.

Means 42 holds battery 40 to component means 34, i.e., radio amplifier 36 in the embodiment shown in FIG. 2. Means 42 may include bracket means 44 which includes a pair of L-shaped brackets 46 and 48. Fastening means 50 and 52 hold one arm of brackets 46 and 48 to radio amplifier 36. The other arms of brackets 46 and 48 are bolted to the bottom 24 of case 12 via fastening means 54 and 56. Members 58 and 60 which may take the form of a springs connect to brackets 46 and 48 and extend to the top of battery 40. Hooks 62 and 64 connected to springs 58 and 60 respectively engages the top of battery 40. Thus members 58 and 60 hold battery and radio amplifier 36 in compression. In addition, tapedeck 38 rests to the top of battery 40 to stabilize any movement which may occur in relation to battery 40 and radio amplifier 36. It should be noted that case 14 may be flexible and would permit the speakers 30 and 32, battery 40, and component means 34 to move as a unit when being carried. Thus, the stacking arrangement hereinabove described provides mechanical stability to the items held within case 12.

Radio amplifier 18 may include antenna 66 mounted to side 22 of case 12. Antenna 22 is of conventional structure.

In operation the user is able to carry apparatus 10 without any damage to any of the items held within case 12. The stacking arrangement hereinabove described prevents the shifting of the items within case 12 during flexure of case 12.

While on the foregoing embodiments in the present invention have been set forth in considerable detail for the purposes of making a complete disclosure of the invention, it may be apparent to those of skill in the art that numerous changes may be made in such detail without departing from the spirit and principles of the invention.

What is claimed:

1. An audio reproduction apparatus having at least one speaker, an electrical battery, and component means for supplying electrical signals to the at least one speaker to produce sound, the improvement comprising:
   a. a case for supporting the at least one speaker, electrical battery, and component means for supplying electrical signals; and
   b. means for holding said electrical battery in relation to said component means for supplying electrical signals within said case, said means including bracket means for contacting said component means for supplying electrical signals, said bracket means being connected to said case, and a member connected to said bracket means and said electrical battery, said member further including means for urging said battery and said component means for supply electrical signals into mechanical compression.

2. The audio reproduction apparatus of claim 1 in which said member connected to said bracket means and said means for urging said battery and said component means for supply electrical signals into compression includes at least one spring.

3. The audio reproduction apparatus of claim 2 in which said case is transparent.

4. The audio reproduction apparatus of claim 3 in which said case is flexible.

5. The audio reproduction apparatus of claim 2 in which said electrical battery has two surfaces and said component means for supplying electrical signals includes two components, said first component being held to one surface of said electrical battery by said spring and said second component contacting said other surface of said electrical battery, said first and second components also being fastened to said case.

6. The audio reproduction apparatus of claim 5 in which said case has at least two surfaces, and said first and second components each have a portion extending through said first and second surfaces respectively.

* * * * *